(12) United States Patent  (10) Patent No.: US 7,959,104 B2
Kuntz  (45) Date of Patent: Jun. 14, 2011

(54) FLYING DEVICE WITH IMPROVED MOVEMENT ON THE GROUND

(76) Inventor: Julian Kuntz, Bremerhaven (DE)

( * ) Notice: Subject to any disclaimer, the term of this patent is extended or adjusted under 35 U.S.C. 154(b) by 357 days.

(21) Appl. No.: 11/722,739

(22) PCT Filed: Dec. 22, 2005

(86) PCT No.: PCT/DE2005/002305

§ 371 (c)(1),
(2), (4) Date: Jun. 25, 2007

(87) PCT Pub. No.: WO2006/066561

PCT Pub. Date: Jun. 29, 2006

(65) Prior Publication Data

US 2008/0048065 A1 Feb. 28, 2008

(30) Foreign Application Priority Data

Dec. 23, 2004 (DE) .......................... 10 2004 063 205

(51) Int. Cl.
*B64C 37/00* (2006.01)
(52) U.S. Cl. ................................. 244/2; 244/50; 446/36
(58) Field of Classification Search .................. 244/1 R, 244/2, 17.23, 17.25, 23 A, 23 B, 23 D, 23 R, 244/12.4, 12.5, 50, 51; 446/34, 36, 37, 55, 446/58, 457, 462, 465, 470
See application file for complete search history.

(56) References Cited

U.S. PATENT DOCUMENTS 1,021,338 A * 3/1912 Rush ................................. 244/50
1,331,221 A * 2/1920 Swanson ..................... 244/23 R (Continued)

FOREIGN PATENT DOCUMENTS
GB 2091571 A * 8/1982

OTHER PUBLICATIONS

Hirschberg et al, From the Past to the Future of Heavy Lift, Part One:"Quad Tilt" Concepts, Summer 2001, Vertiflite, The American Helicopter Society, vol. 47, No. 3, pp. 62-64.

(Continued)

*Primary Examiner* — Joshua J Michener
*Assistant Examiner* — Brian O'Hara
(74) *Attorney, Agent, or Firm* — Brooks Kushman P.C.

(57) ABSTRACT

The invention relates to a flying device which can efficiently move in the air by aerodynamic forces and by direct force transmission on the ground, without the need for independent drive and thrust generation systems for the two modes of movement. The rotors (1) of the flying device are provided on the outside thereof with an annular rotating covering (4), connected directly to the rotor blade tips, which, when the flying device is on the ground and the rotor rotational axes (2) are correspondingly pitched about an axis (3), come into contact with the ground. The covering (4) hence permits a movement of the flying device on the ground by rolling, which is based on a direct force transfer to the ground. A further rotor pitching axis (5) permits the flying device to be controlled in the air and on the ground by means of the same actuator system. The above flying principle permits, for example, remote controlled reconnaissance drones for close or remote espionage, to independently enter inaccessible regions, or in the context of police or military application in buildings presenting danger for personnel, to gain access to upper floors.

14 Claims, 5 Drawing Sheets

U.S. PATENT DOCUMENTS

| | | | | |
|---|---|---|---|---|
| 1,484,410 | A * | 2/1924 | Pridgen | 440/12.5 |
| 1,820,467 | A * | 8/1931 | Liska | 416/168 R |
| D158,936 | S * | 6/1950 | Crowder | D21/442 |
| 2,966,317 | A * | 12/1960 | Ramniceann | 244/20 |
| 3,606,570 | A * | 9/1971 | Haggerty | 416/2 |
| 4,043,421 | A * | 8/1977 | Smith | 180/117 |
| 4,436,261 | A * | 3/1984 | Koleff | 244/51 |
| 6,517,026 | B1 * | 2/2003 | Smith | 244/2 |
| 6,719,244 | B1 * | 4/2004 | Gress | 244/7 R |
| 6,854,686 | B2 * | 2/2005 | Perlo et al. | 244/7 B |
| 7,188,803 | B2 * | 3/2007 | Ishiba | 244/23 R |
| 7,472,863 | B2 * | 1/2009 | Pak | 244/12.5 |
| 2003/0038213 | A1 * | 2/2003 | Yoeli | 244/50 |
| 2004/0026563 | A1 | 2/2004 | Moller | |
| 2004/0104303 | A1 | 6/2004 | Mao | |

OTHER PUBLICATIONS

Andrews, Four Ducts and Eleven Gearboxes!, The Development of the Bell X-22, Summer 2001, Vertiflite, American Helicopter Society, vol. 47, No. 3, pp. 92-96.

Niedzballa et al, The German V/STOL Transport Aircraft VC 400 and VC 500, Summer 2001, Vertiflite, American Helicopter Society, vol. 47, No. 3, pp. 97-100.

Eckenrod, Runway Independent Tiltrotor Aircraft: A Practical Solution to Increasing Air Traffic Capacity, Summer 2001, Vertiflite, American Helicopter Society, vol. 47, No. 3, pp. 72-74.

Spivey, Quad Tiltrotor: Airlift Technology for Army Transformation, Summer 2001, Vertiflite, American Helicopter Society, vol. 47, No. 3, pp. 67-68.

Fluk, The Curtiss-Wright X-19 V/STOL Aircraft, Summer 2001, Vertiflite, American Helicopter Society, vol. 47, No. 3, pp. 80-91.

Kuntz, Entwurf, Flugmechanik and Flugregelung einer Nahbereichsdrohne mit vier kippbaren Rotoren, 2005, Universitat Stuttgart, Abstract from Diplomarbeit.

http://www.intellicopter.de/en/intellicopter.html, The IntelliCopter, retrieved Jan. 15, 2008, pp. 1-2.

http://www.rctoys.com/rc-products-catalog/RC-HELICOPTERS.html, Electric RC Helicopters, retrieved Jan. 15, 2008, pp. 1-4.

http://www.x-ufo.com, retrieved Jan. 15, 2008, p. 1-2.

* cited by examiner

FLYING DEVICE WITH IMPROVED MOVEMENT ON THE GROUND

Aircraft with rotors that can tilt, and therefore have vertical take-off properties, are known from prior art, for example: V22 Osprey.

The rotors of helicopters can also be tilted within certain limits, which is absolutely essential for their control.

On the ground, helicopters usually have only very limited, or no, movement capability, and with other aircraft that have an undercarriage, the forces required for independent movement on the ground are generated by aerodynamic means, i.e. by the compression and acceleration of air. This type of drive is, however, of little use except for take-off and landing, because of its high inefficiency, high noise emissions and difficulty in steering.

There are of course already numerous designs for devices that are both aircraft and ground vehicles at the same time (see IPC Class B60F005-02), but they all have the same decisive disadvantage in that the thrust generation on the ground and in the air is by means of two at least partially separate systems (propellers or rotor(s) and tires driven separately from these), both of which must somehow be accommodated, thus leading to increased overall weight and complicated design. Even when both of these systems are driven by the same engine, complicated force transmission, force distribution and decoupling mechanisms are necessary, which also makes the overall system heavy and susceptible to malfunction. Furthermore, with these separate systems an ever greater variety of load paths have to be considered even in the structural design and have to be designed to be correspondingly stable and heavy.

Furthermore, flying, remote-controlled reconnaissance drones are known, as well as remote-controlled robotic ground vehicles for reconnaissance of inaccessible areas or for the detection and removal of dangers in buildings. The first are, however, mainly suitable only for remote reconnaissance or they have only a short mission duration due to the high energy consumption in hovering flight and the fact that they inevitably draw attention as they move due to the high level of noise. The second are not capable of negotiating steep differences in height or stairs and therefore, for example, are unable to independently gain access to upper floors of buildings or enter a building through an open window.

The object of the invention, given in claim 1, is to provide a flying device that can take off and land anywhere and is also able to move efficiently on the ground with low noise, without separate drive systems having to be provided for both types of movement.

This object is achieved by the features of claim 1. The advantages achieved by the invention are especially that due to the tilting capability, and the co-rotating covering (4), of the rotor or propeller (1), the latter can be used both at high speeds to generate aerodynamic forces and at slower speeds and with contact to the ground as wheel tires, i.e. the lightweight functional construction produces a system that performs several tasks. Furthermore, the main load path in both configurations (FIGS. 1 and 2) is the same, thus leading to an optimum utilization of the weight of the structure.

Due to the advantageous embodiment in claim 2, the flying device is very maneuverable both in the air and on the ground.

The advantageous embodiment in claim 3 means that control can be achieved both in the air and on the ground using the same mechanism and by one and the same actuator system.

Figure 3:
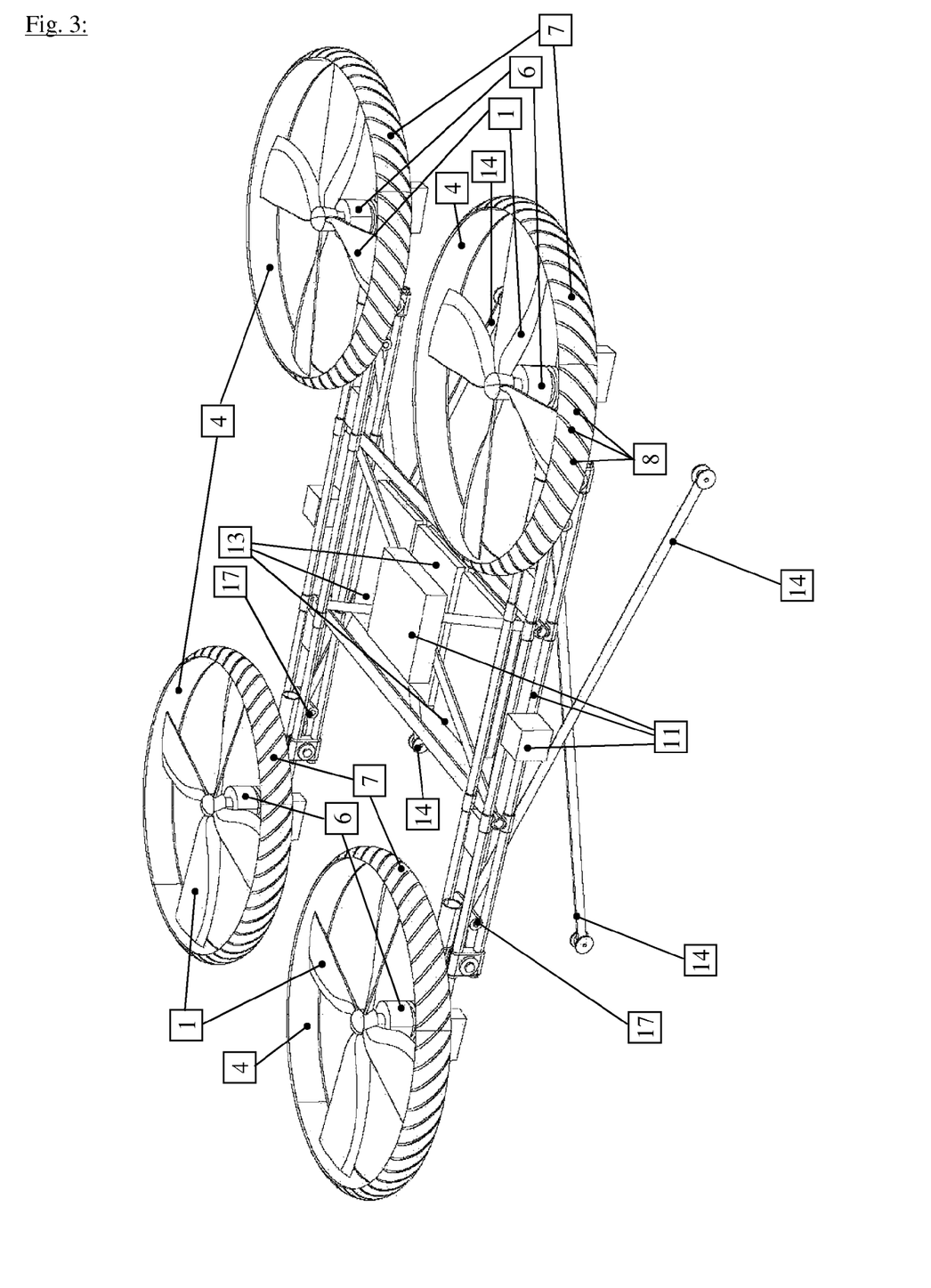
FIG. 3 illustrates the flying device of FIG. 1 in more detail.
Figure 4:
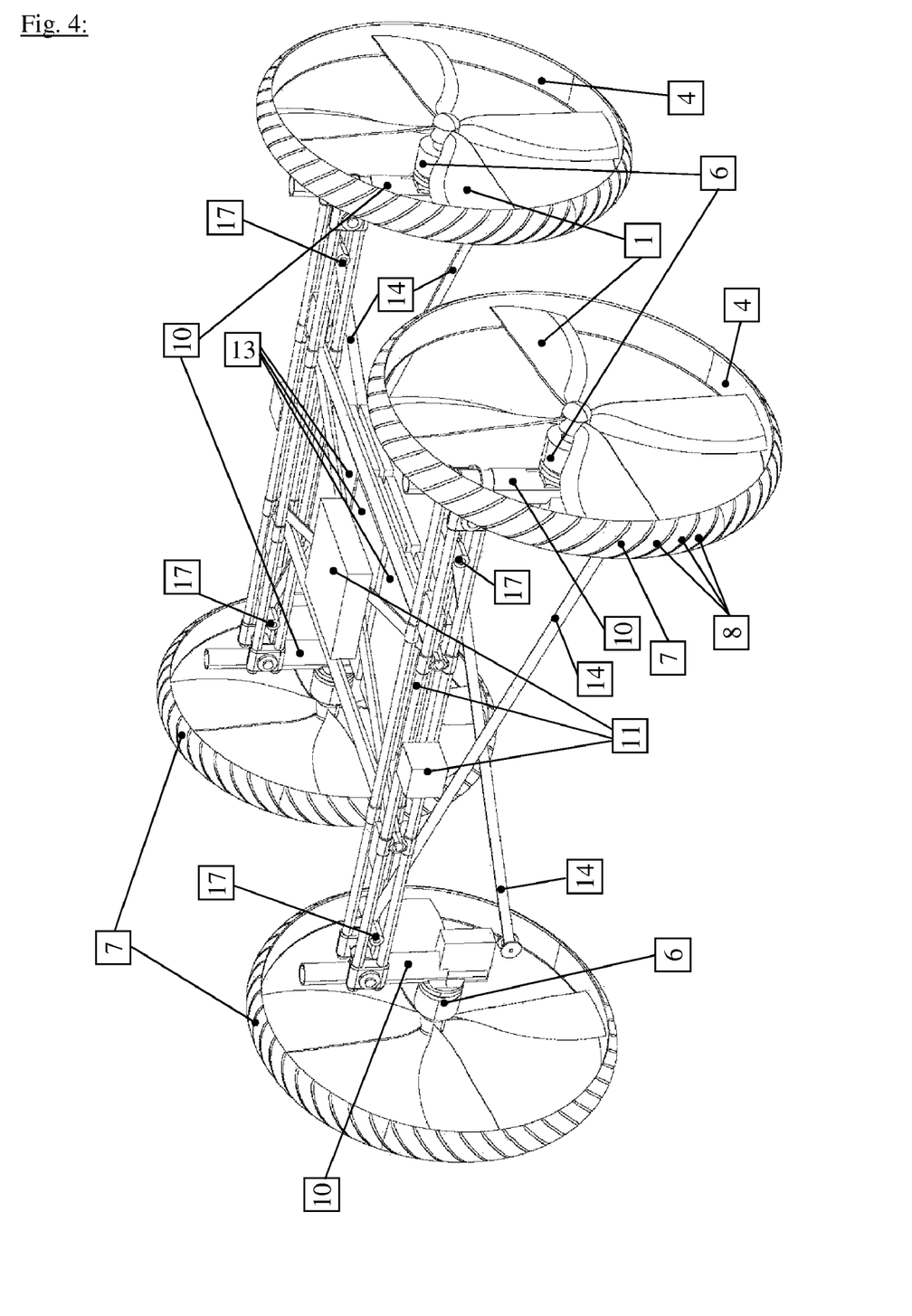
FIG. 4 illustrates the flying device of FIG. 2 in more detail.
Figure 5:
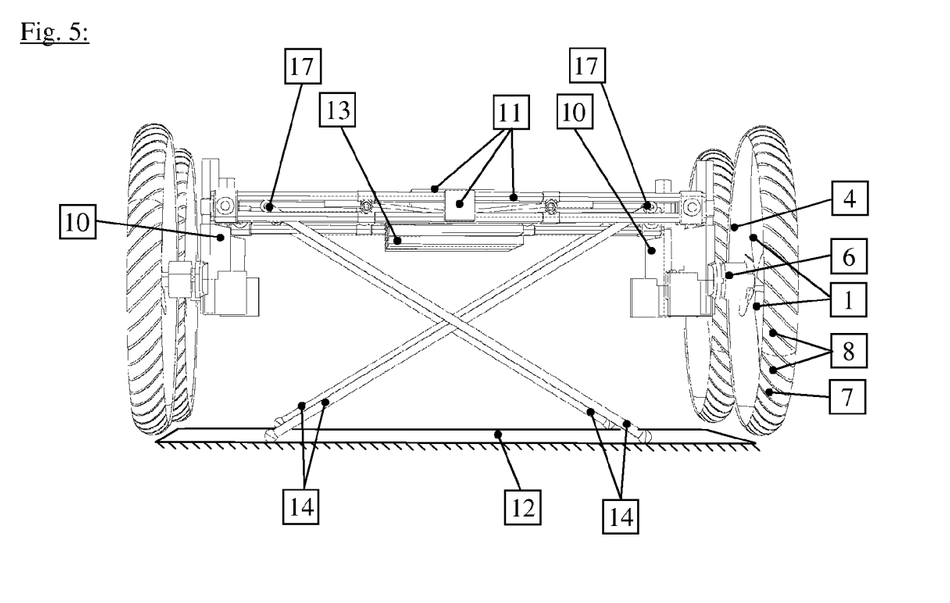
FIG. 5 is an end view of the device of FIG. 4.

An example of the advantageous embodiment is shown in FIGS. 3, 4, and 5. It enables on one hand, by extension of the supports (14), the release of the contact between the ground surface (12) and the outer surface (7) of the rotor/propeller covering (4) in order to make the tilting movement about the first axis (2) possible in the take-off phase (see FIG. 5). On the other hand, it provides a landing gear that, when retracted (see FIG. 4), does not however present a hindrance when moving on the ground. The supports include 4 rods. Each is attached to the central body (11) in a pivot joint (17). Each two of the rods cross next to each other under the central body.

The tips of the support rods (14) can now be extended and retracted relatively to the central body (11) by any arbitrary actuator capable of either effecting rotation of the support rods in the support pivot joints (17) at the links to the central body (11) or effecting a change of distance between the crossing point of the support rods (14) and the central body (11). As a wide range of technical solutions for actuating mechanisms for rotational or linear movements is known to any person skilled in the art, a further explanation of this actuator mechanism is unnecessary.

In this retraction process, the tension in the elastic bands (15) is increased. To extend the supports, the actuator cords are unwound again, so the mechanisms described work in the reverse way, driven by the restoring force of the elastic bands (15). By the elastic bands (15), this mechanism also provides a flexible, damped suspension to cushion the landing shock.

In summary, the flying device has supports that may be retracted and extended. The supports may be provided with damped suspension. They may be suitable for supporting the flying device in a stable position on the ground. In the retracted state, the supports do not touch the ground if the flying device is in the ground configuration. The supports may be configured such that in the extended state the supports raise the flying device sufficiently so that the rotor coverings can no longer come into contact with the ground in any possible tilted position.

When the flying device has landed, the extended supports enable a full downward tilting movement of the rotors around the first tilting axis (2), without any contact to the ground surface (12) hindering it. After that, the rods are rotated again in their pivot joints and their end points move upwards, so they will no longer contact the ground, as now ground contact is given to the rotors (1) with the annular coverings (4) in a downwards tilted position for the ground movement configuration (see FIG. 4).

The advantageous embodiment in claim 5 enables an improved, more variable control.

The advantageous embodiment in claim 6 enables the flying device to be independent of a take-off and landing runway, to be able to take off and land almost anywhere and also hover quietly in the air for observation.

The advantageous embodiment in claim 7 means that the rotor/propeller can always be adapted to the current flight conditions or the current airflow speed in the rotor plane, thus improving the performance and efficiency of the rotor/propeller. Furthermore, as a result of this, when moving fast on the ground the influence of disturbing aerodynamic forces can be minimized by a zero lift pitch setting of the blades.

The advantageous embodiment in claim 8 enables an independent control of the individual rotors without complicated mechanical force-distribution couplings The advantageous embodiment in claim 9 can do away with the need for heavy gear units that take up a lot of space and are subject to losses and susceptible to faults, because brushless, frequency-controlled three-phase motors have a high torque at both low and high rotational speeds.

The flying device as described above may have an energy supply for the motors. The energy supply may be realized by, for example, lithium-polymer accumulators (13) or fuel cells.

The advantageous embodiment in claim 10 enables a long service life without excessively high energy storage weights due to the high specific electrical energy (Wh/kg) of the lithium-polymer accumulators or fuel cells.

The advantageous embodiment in claim 11 improves the force transmission from the rotor covering to the ground due to better ground adhesion.

The advantageous embodiment in claim 12 further improves both the force transmission of the rotor covering to the ground and also utilizes the unavoidable air resistance of a profile of this kind at least partially to slightly improve the quality or efficiency of the rotors/propellers in flight.

The advantageous embodiment in claim 13 means that controllability in flight is further improved because it enables lateral movements of the complete flying body without a rolling motion.

The advantageous embodiment in claim 14 enables the mainplanes fixed in forward flight to be able to undertake the lift generation with the rotors/propellers having to generate only the thrust, which leads to a lower energy consumption and longer service lives.

If the complete system of the flying device described here is designed for use as a remote-controlled, unmanned reconnaissance or observation drone in areas or buildings that are difficult to access and/or present danger to personnel, a drone of this kind can both approach very close to objects on the ground and analyze these precisely and quietly, and can also be used to provide an overview from the air or to cover great distances quickly. It is furthermore able, using its own force, to overcome great height differences and obstacles and can also, using its own force, reach inaccessible areas or higher floors of buildings or enter buildings through open windows or damaged window panes in order as part of police or military actions to detect and analyze dangers therein without humans having to be exposed to danger.

Furthermore, it can move very quietly, at least when moving on the ground. Because the drone also has only to fly briefly to overcome obstacles and very often can move in the energy-saving driving mode, the mission duration can be substantially increased compared with drones that are constantly flying.

If the described flying device designed as a drone additionally carries suitable remote-controlled devices for disarming booby traps or bombs, it can also be used for a mission in accordance with the previous section in order to remove dangers.

When the drone is used as part of police or military actions, there is also the possibility of equipping the drone so that it can release anesthetizing gas which then disables dangerous criminals, such as hostage takers or terrorists who have entrenched themselves in a building to be anesthetized without personnel having to enter the building. With devices of this design, it is of course also to be ensured that they do not fall into unauthorized hands and be misused for criminal or immoral purposes.

When the drone is used as part of police or military actions, there is also the possibility of equipping the drone so that it can release anesthetizing gas which then enables dangerous criminals, such as hostage takers or terrorists who have entrenched themselves in a building to be anesthetized without personnel having to enter the building. With devices of this design, it is of course also to be ensured that they do not fall into unauthorized hands and be misused for criminal or immoral purposes.

It should also be mentioned at this point that there is also the possibility in principle of designing the flying device described in the claims for the transport of personnel or objects, whereby yet further possible applications of the invention result.

An exemplary embodiment of the invention is shown in the drawings, FIGS. 1 and 2, and is described in more detail in the following.

Figure 1:
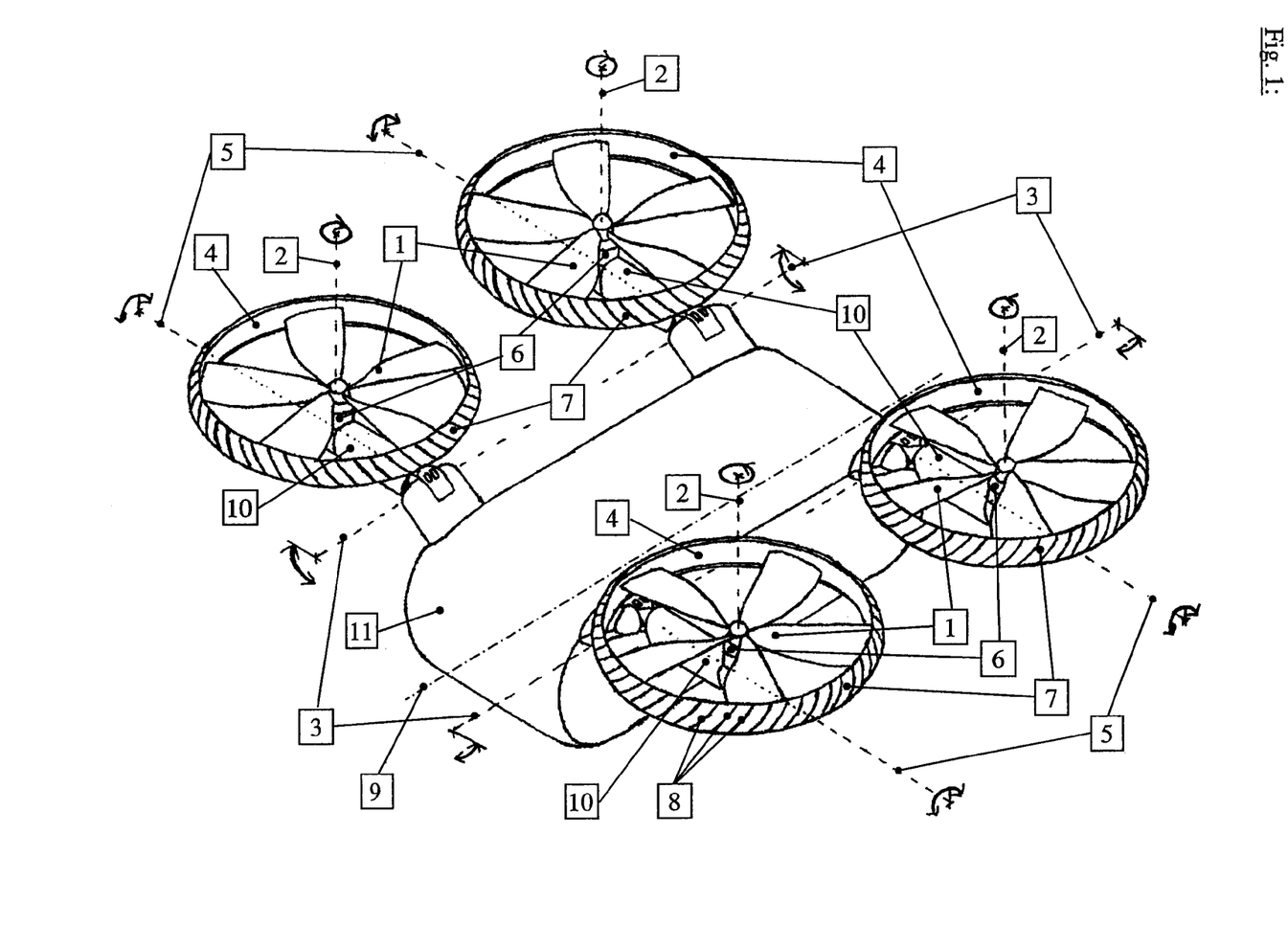
FIG. 1 shows one embodiment of the flying device configured for hovering flight.

FIG. 1 shows the flying device configured for hovering flight, the axes of rotation (2) of the in this example four rotors/propellers (1) are parallel to the gravity vector and generate upwards thrust forces that hold the flying device in the air. By tilting the rotors/propellers about the respective second tilting axis (5), the direction of the thrust vectors can be changed so that either a translatory movement in the direction of the longitudinal axis (9) (all rotors tilt in the same direction) or a rotary movement about the vertical axis (the rotors tilt opposite to the ones lying opposite the longitudinal axis (9) in each case) is introduced.

The hubs of the rotors/propellers (1) are mounted directly on the axes of the four brushless electric motors (6), each of which is attached to the end of an arm (10), which in turn is attached by a swivel joint to the central body (11) of the flying device. The arms (10) each consist of an outer part which is permanently attached to the motors (6) and an inner part which is connected by a swivel joint to the central body (11). The outer and inner parts of the arm can be rotated counter to each other, which enables the tilting movement about the second axis (5). The swivel mounting of the inner arm on the central body (11) enables a 90° tilting movement of the arm (10) from the position shown in FIG. 1, downwards about the first tilting axis (3) (an upwards tilting movement is mechanically prevented) to the position shown in FIG. 2.

Figure 2:
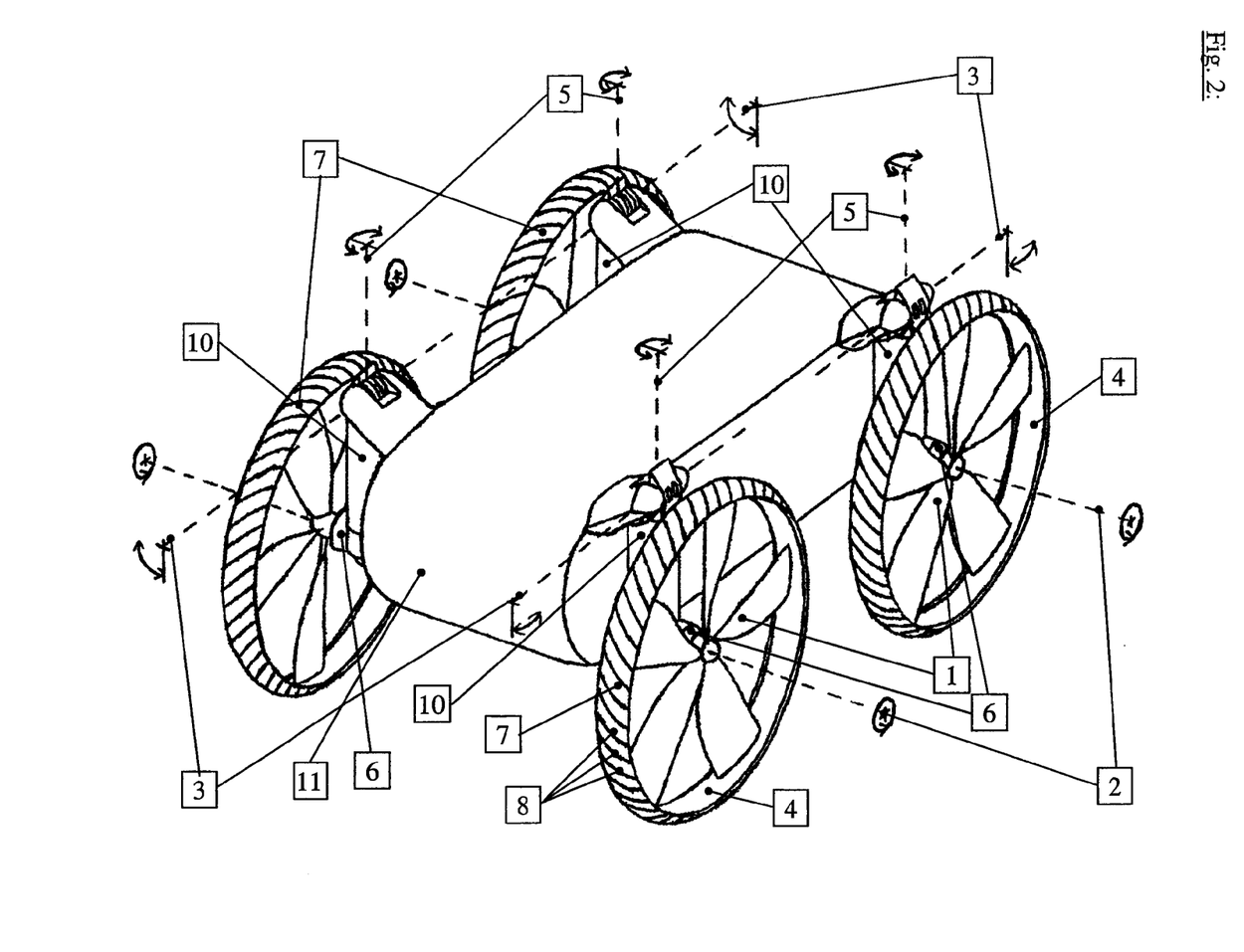
FIG. 2 shows the flying device configured for movement on the ground.

FIG. 2 shows the same flying device as in FIG. 1, but in this case the configuration is for movement on the ground, with the axes of rotation of the rotors/propellers being aligned parallel to the ground. The coverings (4), that co-rotate with the rotors, come into contact with the ground with their outer surfaces (7) designed according to claim 11, which are provided with a profile (8) according to claim 12. The rotor coverings can now be used as wheel tires for movement on the ground, with the control again being achieved by tilting the rotors or wheels about the respective second tilting axes (5) by rotating the outer parts of the arms relative to the inner parts of the arms.

The invention claimed is:

1. A flying device capable of movement on the ground, the flying device comprising:
a central body having a longitudinal axis;
three or more rotors for providing at least some lift during take-off and landing of the flying device and thrust in intermediate flight-regimes, each rotor having a plurality of rotor blades and having a rotational axis corresponding to the rotation of the rotor blades, each rotor being configured to tilt relative to the longitudinal axis between a ground position for movement on the ground such that the rotational axis is substantially parallel to the ground and a take-off flight position such that the rotational axis is substantially normal to the ground during take off;

an annular covering for each rotor, the annular covering being connected to tips of at least some of the rotor blades and rotating therewith, the annular covering of at least one of the at least three rotors contacting the ground during ground operation, the rotational axes being tilted relative to the take-off flight position for movement across the ground, the annular covering further acting as a wheel cover to which torque is applied by the plurality of rotor blades; and an undercarriage connected to the central body, the undercarriage having an extended state for taking the impact of landing, and supporting the flying device in a stable position on the ground, when in said extended state the undercarriage raises the flying device to prevent the annular coverings from contacting the ground prior to take-off and permits the rotational axes to be tilted so as to become substantially normal to the ground thereby enabling the rotor blades to generate lift, and the undercarriage having a retracted state such that the undercarriage is relatively ineffective when the flying device moves on the ground and during flight and the undercarriage does not touch the ground when the flying device moves on the ground.

2. The flying device of claim 1 including a first axis oriented generally parallel to the longitudinal axis and a second axis being oriented generally transverse relative to the longitudinal axis, wherein the rotor blades in a rotor define an orbital plane and the orbital plane can be tilted about either or both of the first axis and the second axis.

3. The flying device of claim 1 wherein when at least one rotor is tilted about the first axis, the rotor moves from the take-off flight position to a position for movement on the ground, and when the at least one rotor is tilted about the second axis, steering of the flying device both in the air and on the ground is effected by the at least one rotor.

4. The flying device of claim 1 further comprising supports having a damped suspension, the supports acting as an undercarriage, taking the impact of landing, and supporting the flying device in a stable position on the ground, the supports being configured to be retracted and extended such that when the supports are retracted the supports do not touch the ground when the flying device moves on the ground and when in the extended state the supports raise the flying device to prevent the annular coverings from contacting the ground.

5. The flying device of claim 1 further comprising at least one arm connected to the central body, each arm hingedly connecting the central body to each respective rotor.

6. The flying device of claim 2 further comprising at least one arm connected to the central body, each arm including an outer part connected to the rotors and an inner part connected to the central body, wherein each outer part can be rotated relative to the corresponding inner part to allow each rotor to be tilted independently of other rotors about the respective first axis and second axis.

7. The flying device of claim 1 further comprising at least one arm hingedly connecting the central body to each respective rotor, wherein each axis of rotation can be vertically aligned relative to the ground and each rotor is configured to enable a vertical take-off, a hovering flight, and a controlled vertical landing.

8. The flying device of claim 1 wherein each rotor blade has a pitch, the pitch being adjustable.

9. The flying device of claim 1 further comprising a motor corresponding to each of the rotors, each motor being configured to drive the corresponding rotor and being configured to be independently controlled.

10. The flying device of claim 1 wherein each of the rotors is directly attached to a corresponding motor axis and the motors are brushless electric motors.

11. The flying device of claim 9 further comprising an energy supply comprising one of lithium-polymer accumulators and fuel cells.

12. The flying device of claim 1 wherein an outer face of the annular covering has a rubber surface.

13. The flying device of claim 1 wherein an outer surface of the annular covering has a profile that counteracts backflow when the flying device is in flight.

14. The flying device of claim 2 wherein the movement about the first axis of the rotors can be used to control the flying device in flight.

\* \* \* \* \*

UNITED STATES PATENT AND TRADEMARK OFFICE
CERTIFICATE OF CORRECTION

| | | |
|---|---|---|
| PATENT NO. | : 7,959,104 B2 | Page 1 of 1 |
| APPLICATION NO. | : 11/722739 | |
| DATED | : June 14, 2011 | |
| INVENTOR(S) | : Julian Kuntz | |

It is certified that error appears in the above-identified patent and that said Letters Patent is hereby corrected as shown below:

Column 6, Line 28, Claim 10:

After "The flying device of claim"
Delete "1" and insert -- 9 --.

Column 6, Line 31, Claim 11:

After "The flying device of claim"
Delete "9" and insert -- 1 --.

Signed and Sealed this
Thirteenth Day of September, 2011

David J. Kappos
*Director of the United States Patent and Trademark Office*